(12) United States Patent
Rodenhouse et al.

(10) Patent No.: US 9,945,414 B1
(45) Date of Patent: Apr. 17, 2018

(54) THERMAL BREAK WASHER SYSTEM AND METHOD FOR BUILDING CONSTRUCTION

(71) Applicant: Rodenhouse, Inc., Grand Rapids, MI (US)

(72) Inventors: Robert H. Rodenhouse, Grand Rapids, MI (US); Jason R. Wigboldy, Grand Rapids, MI (US)

(73) Assignee: Rodenhouse, Inc., Grand Rapids, MI (US)

( * ) Notice: Subject to any disclaimer, the term of this patent is extended or adjusted under 35 U.S.C. 154(b) by 0 days.

(21) Appl. No.: 15/401,735

(22) Filed: Jan. 9, 2017

Related U.S. Application Data

(60) Provisional application No. 62/276,303, filed on Jan. 8, 2016.

(51) Int. Cl.
  *F16B 43/00* (2006.01)
  *E04B 1/76* (2006.01)
  *E04F 13/08* (2006.01)

(52) U.S. Cl.
  CPC .......... *F16B 43/001* (2013.01); *E04B 1/7629* (2013.01); *E04F 13/0832* (2013.01)

(58) Field of Classification Search
  CPC ...... F16B 43/001; F16B 43/00; F16B 43/002; F16B 43/003; F16B 43/004; F16B 43/005;
  (Continued)

(56) References Cited

U.S. PATENT DOCUMENTS

| D32,793 S | 6/1900 | Fauber |
| 843,720 A * | 2/1907 | Waddell .................... E05B 1/00 16/417 |

(Continued)

FOREIGN PATENT DOCUMENTS

DE    102007026733 A1    12/2008

OTHER PUBLICATIONS

Brochure disclosing 2" diameter Plasti-Grip® PBLP2 washer distributed by Rodenhouse Inc. more than one year prior to Sep. 6, 2012.

(Continued)

*Primary Examiner* — Babajide A Demuren
(74) *Attorney, Agent, or Firm* — Gardner, Linn, Burkhart & Ondersma, LLP

(57) ABSTRACT

A thermal break washer and building construction fastening system and method includes a thermal break washer having an outerside, an underside, and a fastener aperture extending there through, with the outerside defining a solid upper surface. A mounting projection extends from the underside and a support projection extends from the outerside, with the mounting projection configured to be pressed into an inner building material to retain the thermal break washer on the inner building material, with the thermal break washer configured to receive a first fastener for securing the inner building material. An outer building material is placed on the support projection, with a retention washer having a plurality of apertures placed over the thermal break washer. The retention washer is configured to receive a second fastener through one of its apertures to secure the retention washer to the thermal break washer with the outer building material disposed there between.

13 Claims, 11 Drawing Sheets

(58) Field of Classification Search
CPC .... F16B 43/006; F16B 43/007; F16B 43/009; F16B 43/02; F16B 43/025; E04B 1/7629; E04F 13/0832
See application file for complete search history.

(56) References Cited

U.S. PATENT DOCUMENTS

| | | | |
|---|---|---|---|
| 2,675,844 A * | 4/1954 | Knohl | F16B 39/24 411/155 |
| 3,069,919 A | 12/1962 | Schultz, Jr. | |
| 3,236,277 A * | 2/1966 | Jones, Jr. | F16B 39/24 411/129 |
| 4,102,239 A | 7/1978 | Dallas | |
| 4,114,597 A | 9/1978 | Erb | |
| 4,292,876 A | 10/1981 | De Graan | |
| 4,793,757 A | 12/1988 | Peterson | |
| 4,959,938 A | 10/1990 | De Caro | |
| 5,079,055 A | 1/1992 | Doyle | |
| 5,419,666 A | 5/1995 | Best | |
| 5,423,858 A | 6/1995 | Bolanos et al. | |
| 5,517,883 A | 5/1996 | Goldi et al. | |
| 5,541,377 A | 7/1996 | Stuhlmacher | |
| 5,803,693 A | 9/1998 | Choiniere et al. | |
| 5,833,422 A | 11/1998 | Haga et al. | |
| D410,869 S | 6/1999 | Singer | |
| 6,039,525 A | 3/2000 | Johnson | |
| 6,231,063 B1 | 5/2001 | Chi | |
| D482,270 S | 11/2003 | Derilo | |
| 6,665,991 B2 | 12/2003 | Hasan | |
| D517,404 S | 3/2006 | Schluter | |
| 7,077,263 B1 * | 7/2006 | Richardson | F16G 3/08 198/844.2 |
| 7,090,455 B2 | 8/2006 | Lamb | |
| D549,091 S | 8/2007 | McIntyre et al. | |
| 7,415,803 B2 | 8/2008 | Bronner | |
| D576,480 S | 9/2008 | Vakiener et al. | |
| D596,934 S | 7/2009 | Vakiener et al. | |
| D634,248 S | 3/2011 | Chen | |
| 7,896,380 B2 | 3/2011 | Tange | |
| D644,921 S | 9/2011 | Hsu et al. | |
| D645,337 S | 9/2011 | Hsu et al. | |
| D660,691 S | 5/2012 | Yamazaki | |
| D663,243 S | 7/2012 | Li | |
| 8,336,275 B2 | 12/2012 | Rodenhouse | |
| D679,169 S | 4/2013 | Else | |
| D679,572 S | 4/2013 | Attaway | |
| 8,413,740 B2 | 4/2013 | Rodenhouse | |
| D682,666 S | 5/2013 | Wigboldy | |
| D696,930 S | 1/2014 | Rodenhouse et al. | |
| D696,931 S * | 1/2014 | Rodenhouse | D8/399 |
| D696,932 S | 1/2014 | Rodenhouse et al. | |
| D744,799 S | 12/2015 | Rodenhouse et al. | |
| D748,973 S | 2/2016 | Rodenhouse et al. | |
| D749,941 S | 2/2016 | Rodenhouse et al. | |
| 9,309,915 B1 | 4/2016 | Rodenhouse et al. | |
| D755,622 S | 5/2016 | Rodenhouse et al. | |
| 2004/0060723 A1 | 4/2004 | Pallapothu | |
| 2004/0084099 A1 | 5/2004 | Miura | |
| 2006/0171794 A1 | 8/2006 | Ordonio, Jr. et al. | |
| 2008/0310932 A1 | 12/2008 | McIntyre et al. | |
| 2010/0019014 A1 | 1/2010 | Rodenhouse | |

OTHER PUBLICATIONS

Brochure disclosing 1-¾" diameter Plasti-Grip® CBW washer distributed by Rodenhouse Inc. more than one year prior to Sep. 6, 2012.
Brochure disclosing 1-¼" diameter Grip-Plate® Tab washer distributed by Rodenhouse Inc. more than one year prior to Sep. 6, 2012.
Brochure disclosing 1-¼" diameter Grip-Plate® Plastic washer distributed by Rodenhouse Inc. more than one year prior to Sep. 6, 2012.
Brochure disclosing 2" diameter Plasti-Grip® CBW2 washer distributed by Rodenhouse Inc. more than one year prior to Sep. 6, 2012.
Brochure disclosing 1-¾" diameter Plasti-Grip® III washer distributed by Rodenhouse Inc. more than one year prior to Sep. 6, 2012.
Brochure disclosing Plasti-Grip® PMF Plastic Masonry Fastener distributed by Rodenhouse Inc. more than one year prior to Sep. 6, 2012.
Brochure disclosing 3" diameter Grip-Lok® "Hurricane" washer distributed by Rodenhouse Inc. more than one year prior to Sep. 6, 2012.
Grid-Mate PB Mechanical Fasteners, 1999 Tool Works, Inc.
Wind-Lock catalog excerpt disclosing fastening tool system available prior to Jul. 23, 2007.
Wind-Lock catalog excerpt, disclosing fastening tool equipment available prior to Jul. 23, 2007.
Wind-Lock catalog excerpt dated 2001.
Wind-Lock catalog excerpt dated 2003.
Stuccofast brochure disclosing fastening system available prior to Jul. 23, 2007.
Performance and Selector Guide 2002, 2001 Illinois Tool Works Inc.
Web pages from ITW Commercial Construction (www.itwramset.com) showing magnetic adapter Part No. 2761910 for metal washers believed to be available more than one year prior to Mar. 15, 2013.

* cited by examiner

THERMAL BREAK WASHER SYSTEM AND METHOD FOR BUILDING CONSTRUCTION

CROSS REFERENCE TO RELATED APPLICATION

The present application claims priority of U.S. provisional application Ser. No. 62/276,303 filed Jan. 8, 2016, which is hereby incorporated herein by reference in its entirety.

BACKGROUND AND FIELD OF THE INVENTION

The present invention is directed to a washer, and in particular to a thermal break washer for building construction.

Constructing buildings requires many tools, parts, and materials at construction sites that generally have many groups of workers constructing many aspects of a building simultaneously. These tools, parts, and materials are often brought to construction sites in small batches because of restricted access and storage capabilities at the construction sites. Thus, using materials with multiple components generally increases the construction cost and time by requiring many shipments. Materials with many components also require additional steps and time to construct a building. Using materials that require more construction steps increases the likelihood of causing errors and damaging the building, which adds cost and time to correct. Thus, reducing the amount of tools, parts, and materials at a construction site may reduce the cost and time of constructing a building.

SUMMARY OF THE INVENTION

According to an aspect of the present invention, a thermal break washer is used in building construction, particularly for constructing building walls having a stucco, exterior insulation finishing system ("EIFS"), or other such siding.

The thermal break washer includes a sealing body having an outerside, an underside disposed opposite the outerside, and an aperture disposed between the outerside and the underside. The aperture is configured to receive a fastener to secure the washer against the surface of a building material, such as rigid insulation. The underside of the washer includes one or more mounting projections configured to penetrate the insulation to initially self-support the washer, with the fastener subsequently provided to fix the washer and insulation to a building, such as to a stud of the building. The outerside of the washer includes spotting members or support projections extending opposite the wall-engaging portion that are configured to enable materials, such as drainage fabric and metal wire lathe to be supported thereon, with the support projections extending through the drainage fabric and lathe. A retention washer may then be disposed over the support projections, with a separate fastener being driven through the retention washer into the body of the thermal break washer to retain the drainage fabric and lathe to the thermal break washer, and thus to the building wall.

A method of securing building materials to a building in accordance with an aspect of the present invention comprises providing a thermal break washer and a retention washer, with the retention washer having a plurality of apertures and the thermal break washer having an outerside, an underside, and a fastener aperture extending there through, with the outerside defining a solid upper surface and a mounting projection extending from the underside and a support projection extending from the outerside. The method includes pressing the thermal break washer against a first building material such that the mounting projection extends into the first building material whereby the thermal break washer is self-supported on the first building material, and driving a first fastener through the fastener aperture to secure the first building material to a building element. The method further includes placing a second building material over the support projection of the thermal break washer with the support member extending through the second building material, and positioning an aperture of the retention washer over the support projection such that the second building material is positioned between the thermal break washer and the retention washer. The method also includes driving a second fastener through an aperture of the retention washer into the thermal break washer, with the second fastener being axially offset from the first fastener.

The thermal break washer in accordance with the present invention inhibits heat transfer between the exterior and interior of a building, as well as inhibits moisture from penetrating into the interior of a building. The thermal break washer additionally increases construction efficiency by reducing the number of total parts to assemble at a construction site. These and other objects, advantages, purposes and features of this invention will become apparent upon review of the following specification in conjunction with the drawings.

BRIEF DESCRIPTION OF THE DRAWINGS

FIG. 10 is a cutaway side plan view of the assembly of FIG. 9 illustrating the thermal break washer mounted to the wall by a fastener to secure the insulation to the wall, and with the retention washer secured to the thermal break washer by a separate fastener with the drainage fabric and lathe secured there between.

DESCRIPTION OF THE PREFERRED EMBODIMENTS

Figure 1:
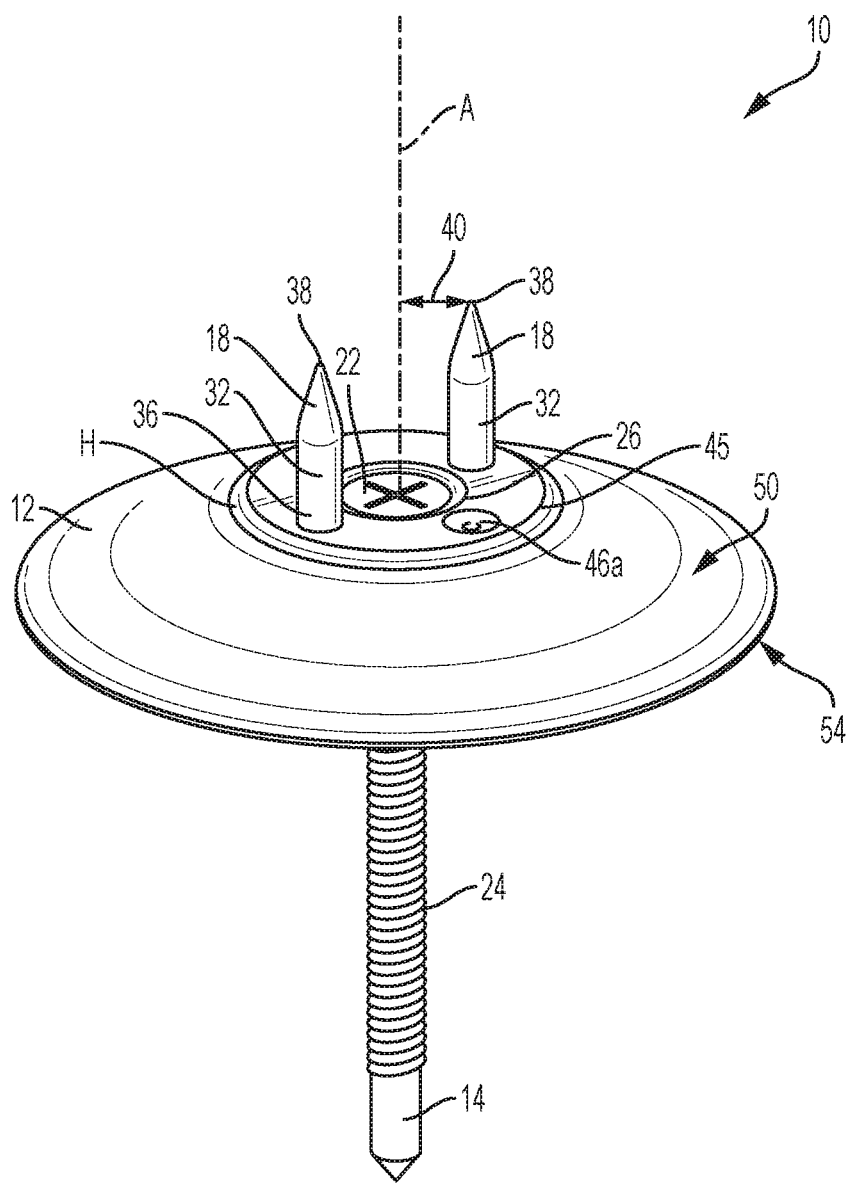
FIG. 1 is a top perspective view of a thermal break washer showing a fastener and sealing apertures in accordance with an aspect of the present invention.
Figure 2:
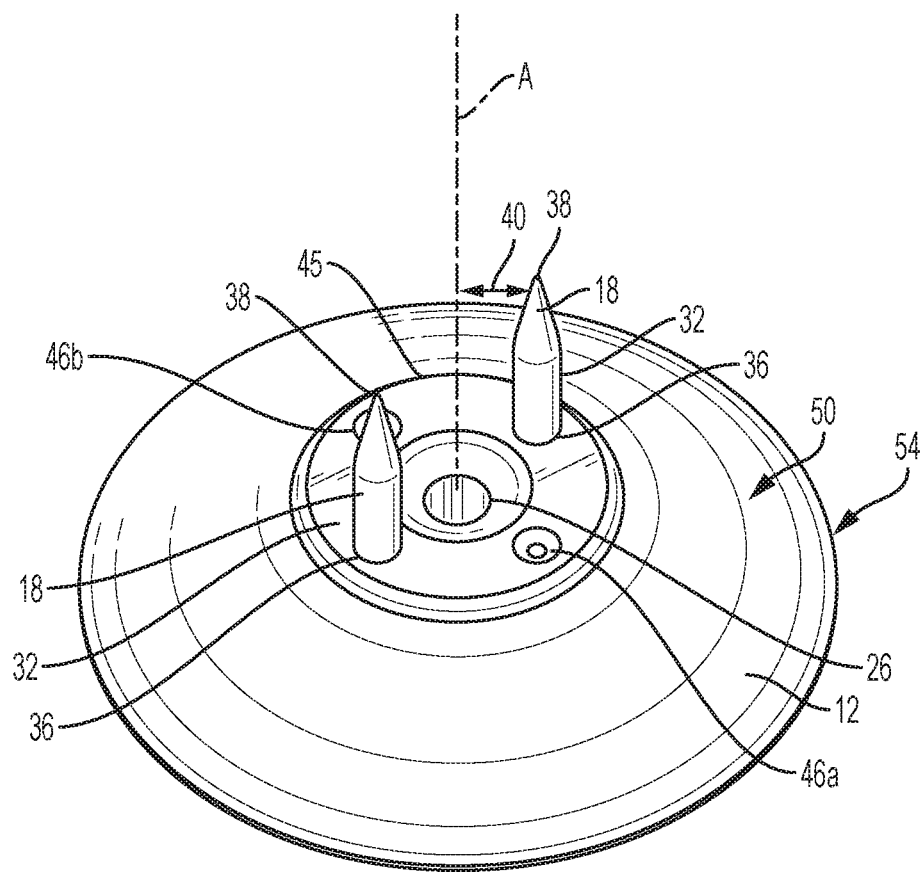
FIG. 2 is a top perspective view of the thermal break washer of FIG. 1 with the fastener removed and showing the sealing apertures.
Figure 3:
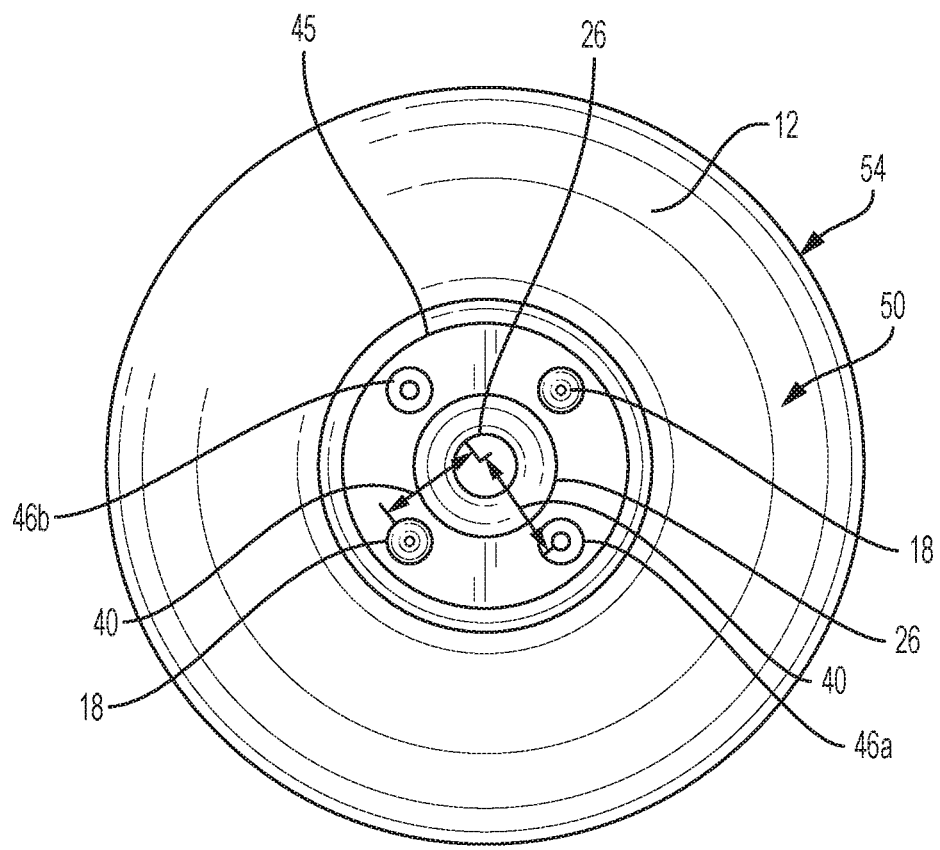
FIG. 3 is a top plan view of the thermal break washer of FIG. 1 showing the sealing apertures.

The present invention will now be described with reference to the accompanying figures, wherein the numbered elements in the following written description correspond to like-numbered elements in the figures. According to an aspect of the present invention, a thermal break washer 10 for use in building construction is shown in FIGS. 1-6 with washer 10 including a sealing body 12, a pair of radially offset retention protrusions or prongs 16 extending downwardly from body 12, and a pair of radially offset upwardly extending protrusions or prongs comprising spotting members 18. A fastener 14 is shown disposed through a central aperture 26, with the fastener being used to fix the thermal break washer 10 to a building element or wall W, such as a wooden or metal stud comprising a support, through insulation I, with the retention protrusions 16 operating to initially secure the washer 10 to the insulation prior to fastener 14 being driven through washer 10. Fastener 14 and washer 10 thus secure rigid insulation I to a building wall W.

Additional building materials, such as drainage fabric D and a wire mesh lathe L (FIGS. 7-11) are subsequently positioned over the spotting members 18, as discussed in more detail below. A retention washer 20 is then further positioned over the spotting members 18 to retain the drainage fabric D and lathe L in position. The retention washer 20 includes apertures 42 for positioning over the spotting members 18, with retention washer 20 further including a fastener aperture 44. When retention washer 20 is mounted to the spotting members 18, fastener aperture 44 is aligned with an indentation 46a or 46b located within an inner perimeter location 45 of body 12 such that another fastener 48 can be driven through fastener aperture 44 and through body 12 at the indention 46a or 46b. The fastener 48 thus secures the drainage fabric D and lathe L to the thermal break washer 10 without the additional fastener 48 having to penetrate the building wall W. Body 12 of washer 10 additionally separates the fastener 48 and fastener 44 from each other to provide a thermal break from heat transfer between the exterior and interior of the building, as well as providing a break to inhibit moisture that may wick along fastener 48 from entering the interior of building. A building exterior material, such as stucco S (FIG. 10), may then be applied to the lathe L.

In the illustrated embodiment washer 10 is constructed of a plastic or polymeric material, and thereby provides thermal insulating properties, with body 12, protrusions 16 and spotting members 18 being integrally and unitarily formed, such as by molding.

Referring to FIGS. 1-3, and 5, the spotting members 18 of washer 10 comprise protrusions that have a first end 36 at the body 12 and a second end 38 extending away from the body 12. In the illustrated embodiment, the spotting members 18 are both equally and radially displaced from the central axis A of the body 12 by an offset 40, such that first ends 36 are radially outward from the central axis A, and the spotting members 18 extend perpendicular to the body 12. Alternatively, the spotting members 18 may extend at a non-perpendicular angle from the body 12 or be alternatively spaced.

Referring to FIGS. 1-6, the body 12 includes an underside 34 and an outerside 50 opposite underside 34, with aperture 26 extending between the outerside 50 and the underside 34. The body 12 includes a circular perimeter 54, with underside 34 including an outer sealing surface 55 adjacent the perimeter 54. Sealing surface 55 defines a ring that forms a seal against insulation I when washer 10 is secured against insulation I. Underside 34 further includes an additional, inner sealing surface 57 surrounding aperture 26 that may also form a seal against insulation I when washer 10 is secured against insulation I.

Outerside 50 is generally convex or rounded when viewed from above, with underside 34 being slightly concave or generally flat. Thus, prior to mounting washer 10, inner sealing surface 57 may initially be recessed inward from sealing surface 55. Body 12 is flexible to enable inner sealing surface 57 to contact insulation I when secured in place. It should be appreciated, however, that alternative shapes and constructions may be employed.

Aperture 26 is generally concentrically positioned within perimeter 54, and within inner perimeter 45, such that it is centered along central axis A of the body 12. Aperture 26 receives the fastener 14, as described above, to secure washer 10 to a building wall W with insulation I disposed between washer 10 and wall W, such that insulation I is securely held in place. When so mounted, underside 34 of washer 10 is disposed against the surface of insulation I. (See FIGS. 7-11). In particular, outer sealing surface 55 forms a seal against insulation I. In addition, as noted with underside 34 being slightly concave, body 12 is flexible and, in particular, the radial outer portion or ring of body 12 that is radially disposed beyond inner perimeter 45 is able to flex sufficiently to the extent that upon securing washer 10 via fastener 14, body 12 will flex whereby sealing surface 57 will also engage against insulation I.

The pair of offset retention protrusions 16 (FIGS. 4-6) are integrally formed to the underside 34 of the body 12, specifically on reinforcing members 28, and are equally radially spaced from central axis A of the thermal break washer 10. The retention protrusions 16 are generally similar to spotting members 14, but in the illustrated embodiment retention protrusions 16 have shorter shafts 33 than the shaft 32 of members 18 and are alternatively spaced from axis A. In use, retention protrusions 16 are pressed into insulation I to self-retain washer 10 to the insulation I prior to fastener 14 being driven through washer 10. It should be appreciated that alternatively formed and located retention protrusions 16 may be employed, and that an alternative number of retention protrusions may be employed.

Figure 4:
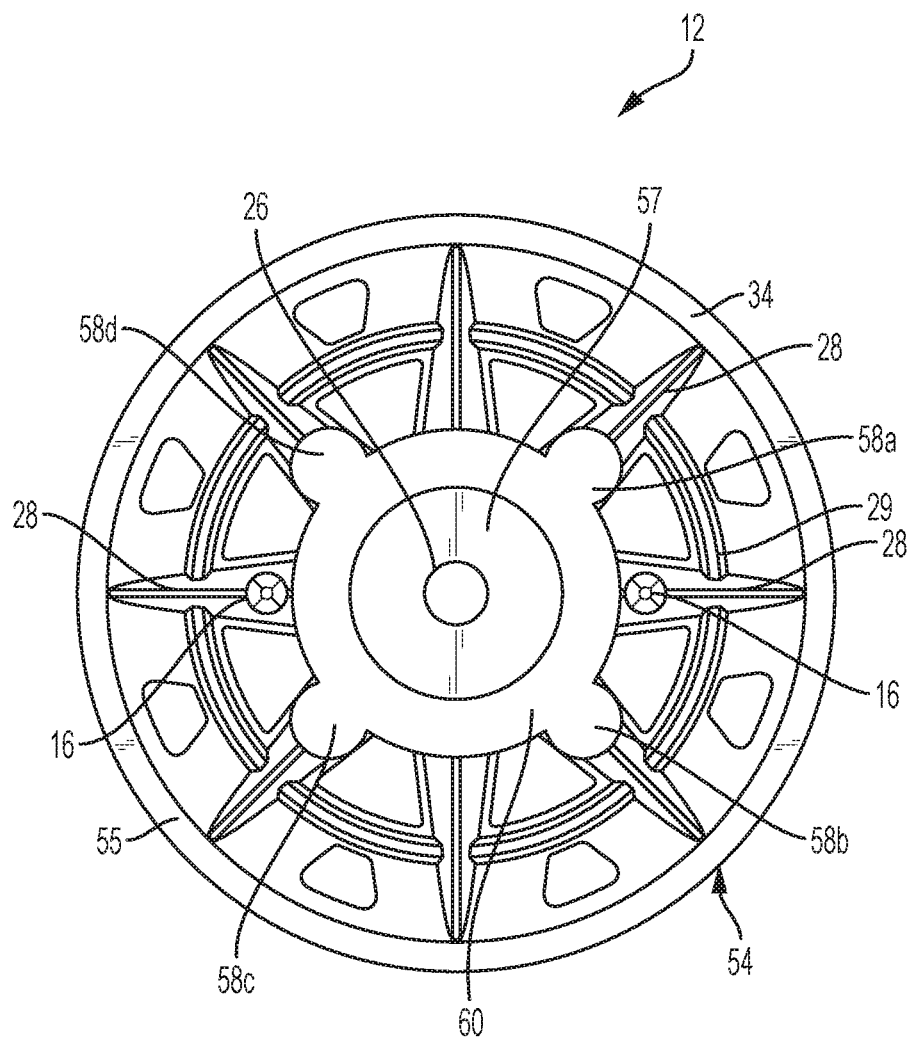
FIG. 4 is a bottom plan view of the thermal break washer of FIG. 1 showing reinforcing members, a sealing portion, and setting members.
Figure 5:
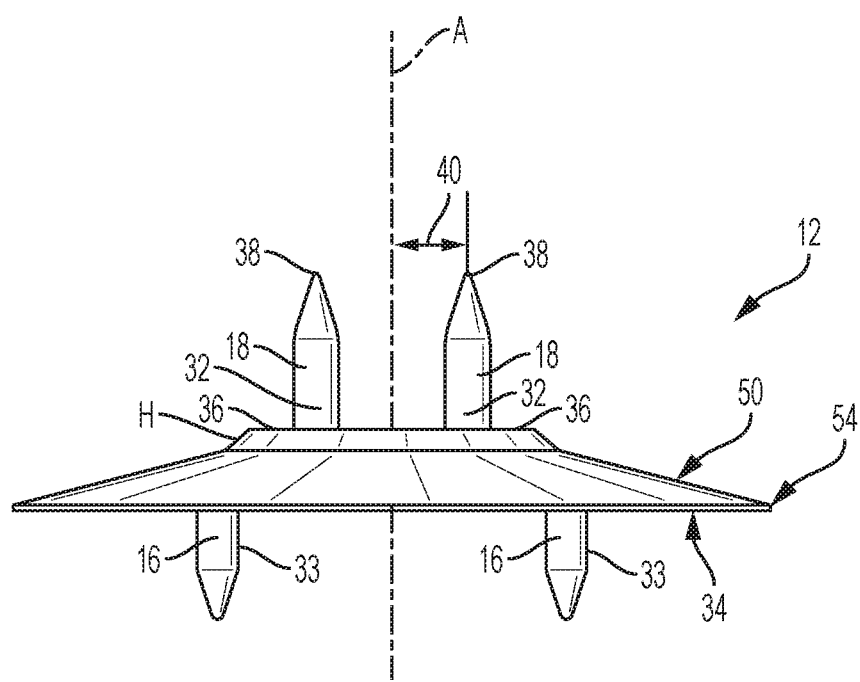
FIG. 5 is a side elevation view of the thermal break washer of FIG. 1.
Figure 6:
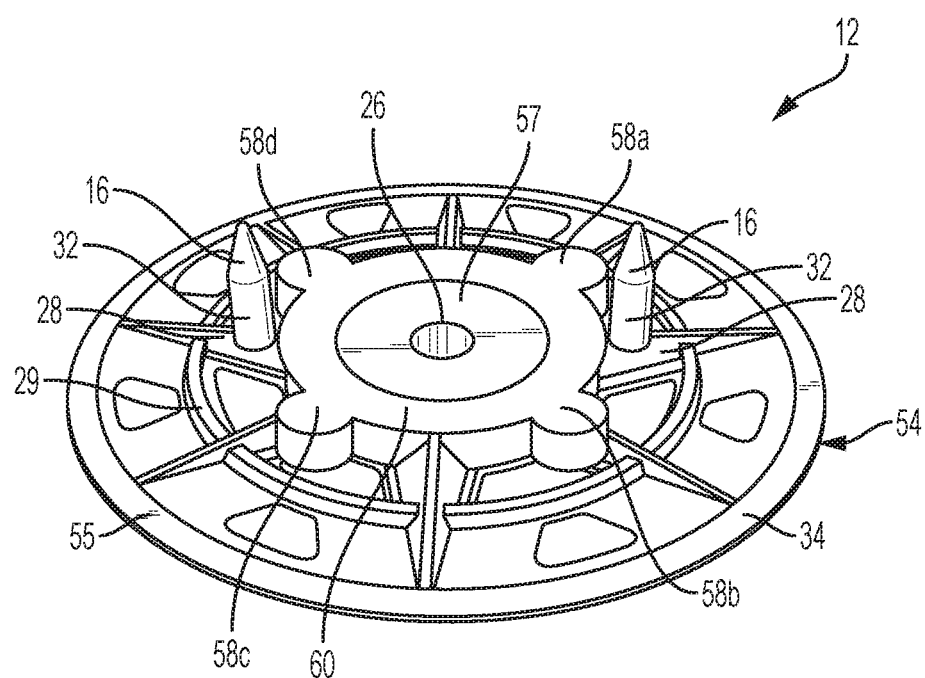
FIG. 6 is a bottom perspective view of the thermal break washer of FIG. 1 showing the reinforcing members, sealing portion, and setting members.

In the illustrated embodiment shown in FIGS. 4 and 6, underside 34 of washer 10 includes reinforcing members, such as tapered ribs 28 and concentric rings 29, which increase the structural rigidity of the body 12. For example, the plurality of reinforcing members 28 are substantially radially aligned from the aperture 26.

Underside 34 further includes an inner portion or pad 60 that includes setting members or pads 58a, 58b, 58c, 58d that add structural rigidity to the body 12 and may align with the indentations 46a, 46b formed on the outerside 50 that receive the fastener 48, as described herein, with inner portion 60 additionally including the inner seal surface 57. In the illustrated embodiment, setting members or pads 58a, 58b, 58c, 58d are radially displaced from the central axis A of the body 12 on the underside 50 by offset 40. Inner portion 60, and thus pads 58a, 58b, 58c, 58d, comprise a thickened portion of washer 10 for providing sufficient material for engagement with fastener 48. That is, in the illustrated embodiment, the thickness of inner portion 60 is such as to provide sufficient thread engagement with the threads of fastener 48 whereby fastener 48 will be fixed to washer 10 to support drainage fabric D and lathe L. As such, in the illustrated embodiment inner portion 60 and/or pads 58a, 58b, 58c, 58d are substantially the entire thickness of the washer from the upper inner perimeter portion 45 of the outerside 50 to the underside 34. Moreover, prongs 16 are located radially beyond inner portion 60 relative to central axis A such that inner portion 60, and sealing surface 57, is disposed inwardly of prongs 16. It should be appreciated that the reinforcing members 28, 29, inner portion 60 and pads 58a, 58b, 58c, 58d may have varied configuration, for example, the inner portion 60 could be of generally larger size to encompass setting members 58a, 58b, 58c, 58d whereby the inner portion would comprise a generally circular member. Moreover, pads need not have a circular profile.

Figure 7:
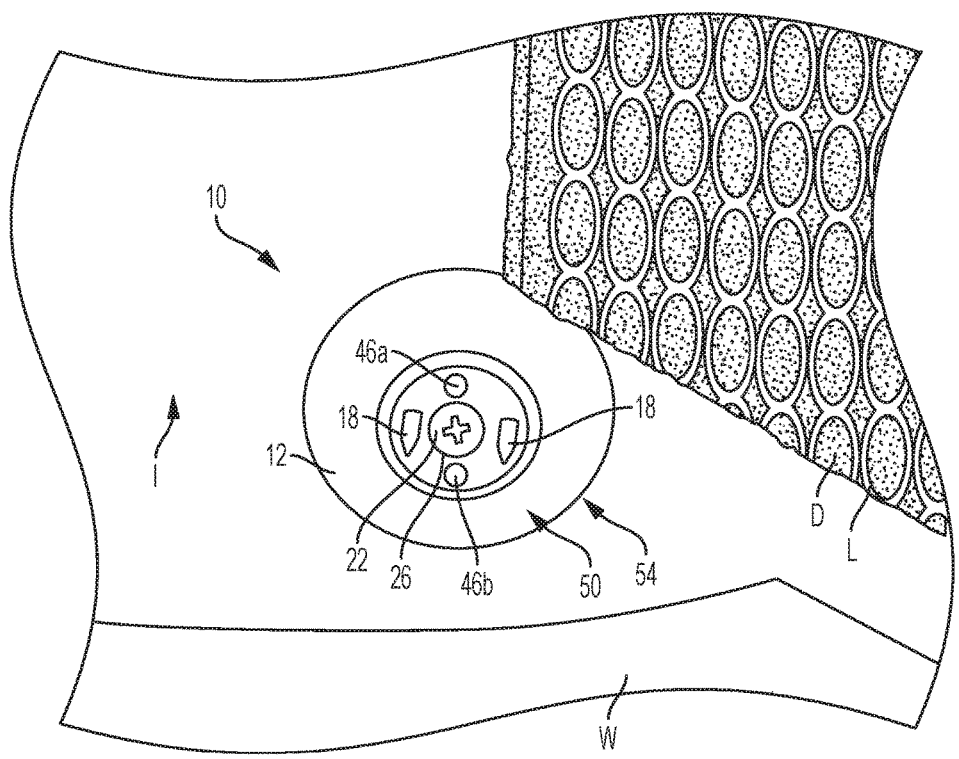
FIG. 7 discloses the thermal break washer installed on insulation of a building wall and adjacent to drainage fabric and lathe with a portion of the insulation removed to illustrate the wall behind the insulation.
Figure 8:
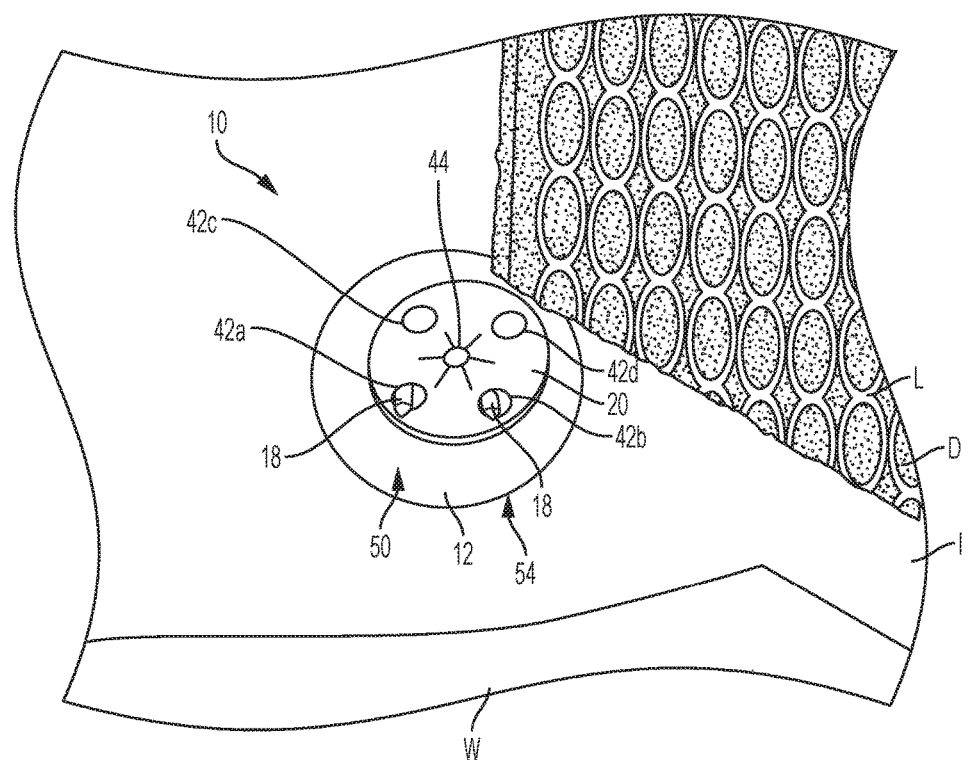
FIG. 8 discloses the thermal break washer installed on insulation of FIG. 7 with a retention washer aligned to the spotting members for illustrative purposes and shown without the drainage fabric and lathe between the thermal break washer and retention washer for purposes of understanding.

Fastener 14 is configured to penetrate through insulation I to fix washer 10 to the building wall W (FIGS. 7-8). For example, fastener 14 is generally a screw or nail having a head 22 and a shaft 24 that fits through the aperture 26. FIG. 1 shows the head 22 of the fastener 14 set within the thermal break washer 10, with the head 22 being generally flush with the upper inner perimeter portion 45 of thermal break washer 10, such as when washer 10 would be affixed to a wall W. Head 22 additionally seals against washer 10, such as against a chamfered portion about aperture 26 configured to receive the angled head 22 of fastener 14, and with the underside of washer 10 including a sealing portion, as discussed above and below, to inhibit moisture from passing by washer 10. The chamfer in the outerside 50 about aperture 26 further aids to recess the head 22 from the surface of the outerside 50.

Upon fastener 14 being driven through washer 10 to retain insulation I to a building wall W, drainage fabric D and lathe L may be positioned over spotting members 18, with spotting members 18 thus initially aiding in the retention of the drainage fabric D and lathe L in place until retention washer 20 is subsequently secured to washer 10. Spotting members 18 are sized to have a length whereby when drainage fabric D and lathe L are positioned over spotting members 18, the spotting members 18 protrude out of or beyond the plane of the lathe L to thereby receive retention washer 20. It should be understood that FIG. 8 illustrates retention washer 20 installed to thermal break washer 10 without drainage fabric D and lathe L being in place for illustrative purposes.

Figure 9:
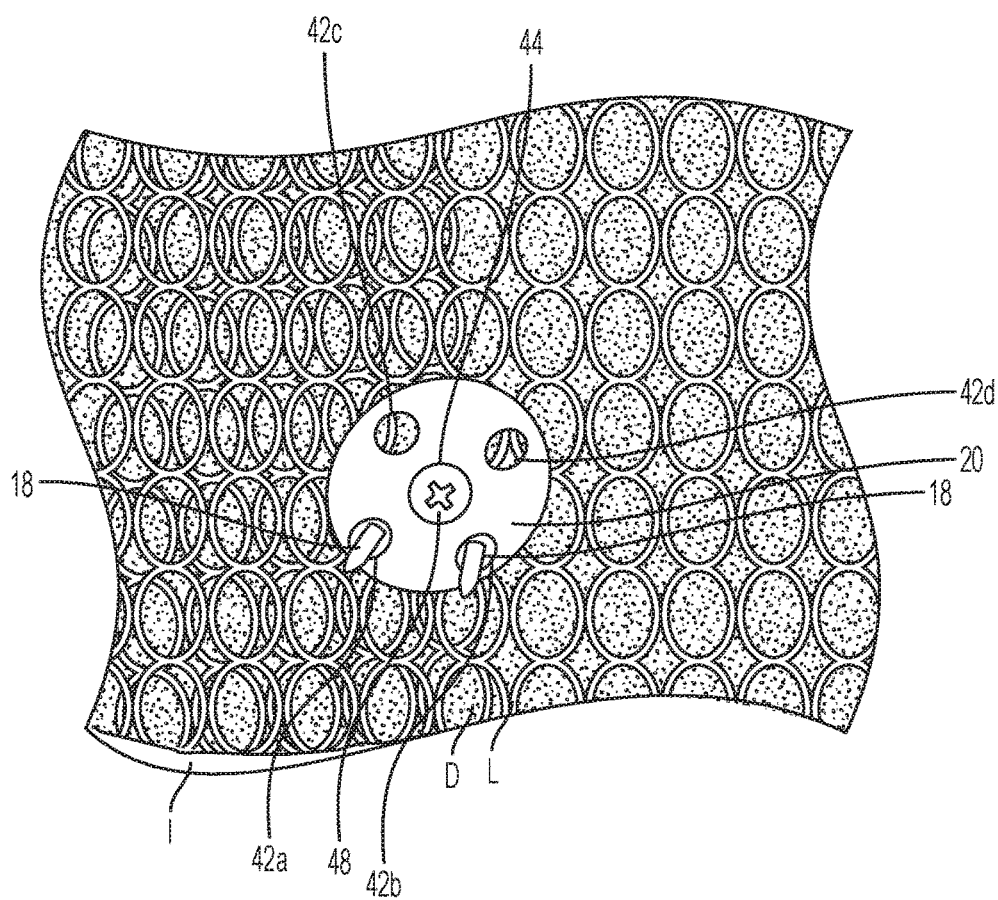
FIG. 9 discloses the retention washer secured to the thermal break washer with the drainage fabric and lathe installed there between after the thermal break washer is secured to the building wall to secure the insulation thereto.
Figure 10:
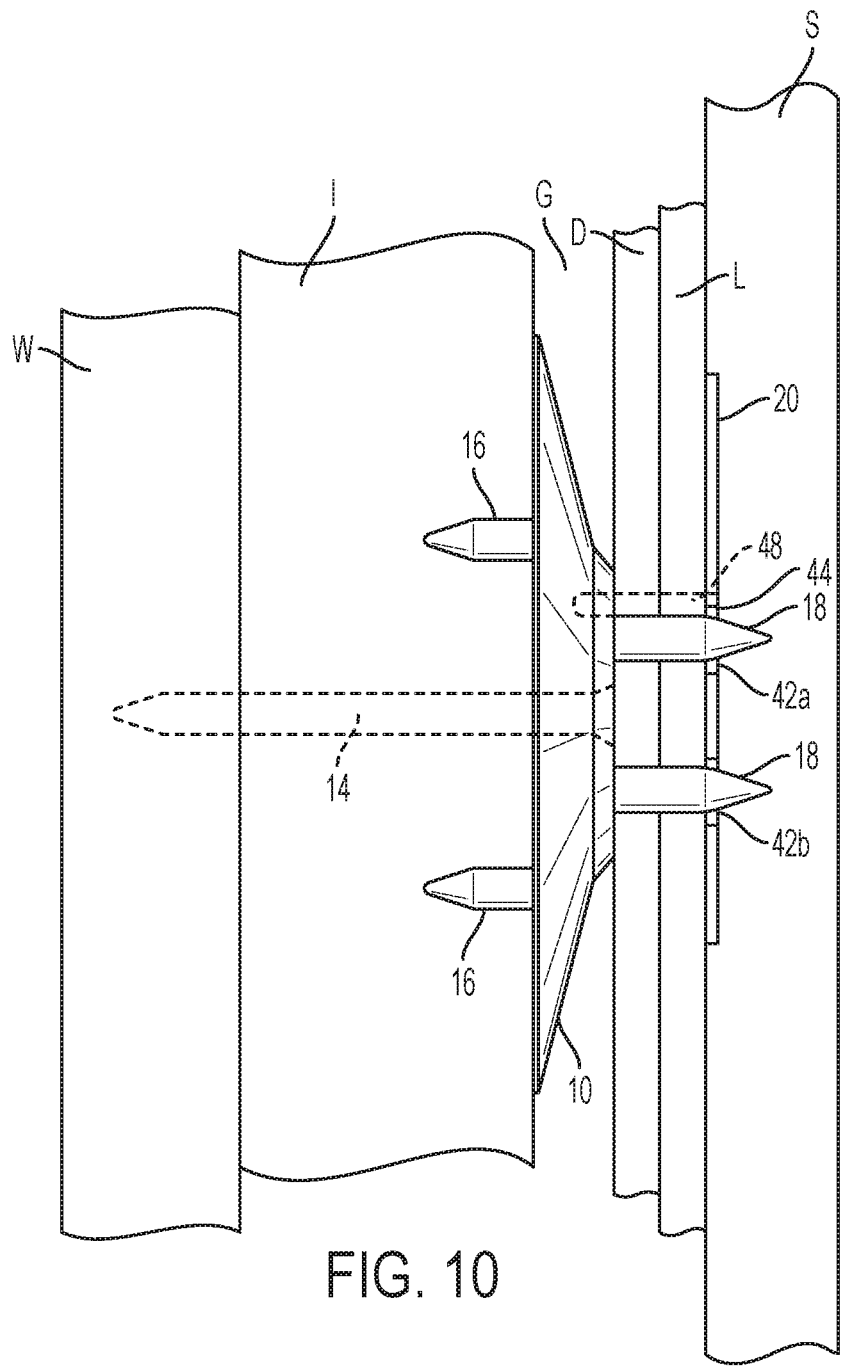
Figure 11:
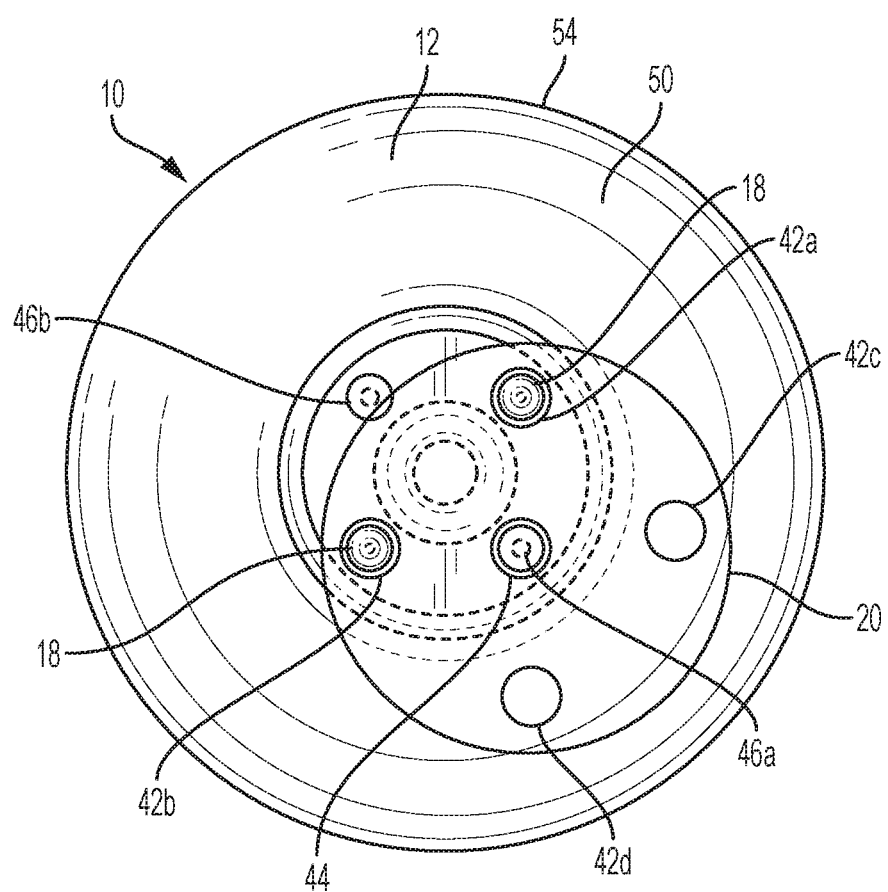
FIG. 11 is a top plan view of the retention washer aligned on the spotting members of the thermal break washer without the drainage fabric and lathe there between for illustration purposes.

The retention washer 20 is a generally circular washer, shown in FIGS. 8 and 9 as a metallic washer, having a plurality of alignment apertures 42a, 42b, 42c, 42d configured to have two apertures be selectively aligned and mounted on spotting members 18. Each aperture 42a, 42b, 42c, 42d has a diameter that is generally larger than the diameter of shafts 32. The alignment apertures 42a, 42b, 42c, 42d are generally equally spaced from one another and radially displaced from the center of alignment washer 20 in a similar manner as the offset 40 of spotting members 18. A central fastener aperture 44 is positioned at the center of the alignment washer 20.

In use, as understood from FIGS. 8-11, two of the radially displaced alignment apertures 42a, 42b are mounted in alignment over two of the spotting members 18 protruding through the drainage fabric D and lathe L, after the drainage fabric D and lathe L are placed over the washer 10 that is used to secure the insulation I to the wall W. Alignment apertures 42a, 42b align the center aperture 44 of the alignment washer 20 to one of a pair of indentations or 46a, 46b (FIGS. 1-3) of the body 12. Fastener 48 is then driven through aperture 44 into the aligned indentation 46a or 46b to secure the washer 20 to the body 12, with drainage fabric D and lathe L secured between thermal break washer 10 and retention washer 20. As noted, indentations 46a, 46b are located in alignment with inner portion 60 of the underside of body 12, such as portions 53, to provide sufficient engagement material. Fastener 48 engages and seals with body 12, with fastener 48 being preferably sized to have a length so as not to penetrate into or through wall W. In the illustrated embodiment indentations 46a, 46b provide an initial guide location for fastener 48. It should be appreciated, however, that indentations 46a, 46b may not be included on washer 10, or that they may be formed as apertures extending from the outerside 50 to the underside 34. Upon securing of drainage fabric D and lathe L to washer 10, stucco, or an EIFS building material, or other such material, may be applied to the wire mesh lathe L as is conventionally performed.

Alternatively, the spotting members 18 protruding through the drainage fabric D and lathe L may be mounted on two radially opposite spotting members 18 via alignment apertures 42a, 42b, 42c, 42d, such that the center aperture 44 of the alignment washer 20 is aligned with the central axis A of the body 12. That is, with respect to the illustrated embodiment, either apertures 42b and 42c or apertures 42a and 42d would be disposed over the spotting members 18. Therefore, the indentations or sealing apertures 46a, 46b align with the other two of the radially displaced alignment apertures 42a, 42b, 42c, 42d that are not aligned with the spotting members 18. The alignment fastener 48 thus fastens through one of the radially displaced alignment apertures 42a, 42b, 42c, 42d and one of the aligned indentations 46a, 46b to secure the alignment washer 20 to the body 12. In this arrangement the alignment aperture through which the fastener 48 is passed comprises the fastener aperture.

Thermal break washer 10 inhibits moisture from passing through the insulation I by forming a seal between the body 12 and insulation I. The body 12 forms the seal by being fixed flush to the insulation I (see FIGS. 7-9). The outer perimeter 54 seals against the insulation I to inhibit moisture from passing there through. Still further, body 12 includes an inner portion 60 (FIGS. 4 and 6) that, upon fastener 14 affixing thermal break washer 10 to insulation I, the body 12 flexes whereby inner portion 60 additionally forms a seal by engaging insulation I to provide a further seal to inhibit moisture from reaching the puncture in the insulation I created by fastener 14.

The body 12 may additionally provide an insulating gap G (FIG. 10) between the insulation I and the drainage fabric D when the drainage fabric D is mounted or affixed to the spotting members 18. The outerside 50 may have a hump H that aids in forming the insulating gap G between the insulation I and the drainage fabric D. For example, a concave center may have a substantially circular perimeter that is concentric with the perimeter 54 of the sealing body 12. Therefore, the thermally insulating properties and the gap substantially thermally insulate the insulation from the drainage fabric D and lathe L. The hump H additionally aids in providing sufficient material for engagement of the fastener 48 with the body 12 of the washer 10.

The present invention provides a thermal break washer to increase the efficiency of constructing stucco, EIFS or other such siding systems by creating a barrier to thermal losses and inhibiting moisture from entering the building, as well as reducing the number of total parts to assemble at a construction site. It should be appreciated that numerous washers 10 may be employed in affixing insulation I to a wall W. Moreover, often these building constructions require a water barrier (not shown), such as via a flexible membrane sheet or painting applied over the exterior facing surface of the insulation I. The membrane may be plastic, rubber or a coated-fabric material, for example, and be of various thicknesses. In such cases, the thermal break washer 10 will puncture the water-resistant barrier between the drainage fabric D and insulation I to inhibit moisture from the exterior of the building from reaching the insulation I. Upon securing the washer 10 to wall W, however, the washer 10 will seal against the insulation I, both at the underside via sealing surfaces 55, 57, and via the engagement of the head 22 of fastener 14 with the body 12. Still further, engagement of the subsequent fastener 48 for securing the retention washer 20 over the drainage fabric D and lathe L, the fastener 48 will mechanically seal against body 12 of washer 10 by the fasteners 48 engagement with the body 12. As such, moisture will be prevented from getting past insulation I at washer 10.

The thermal break washer includes a sealing body having protrusions projecting from both a bottom side as well as a top side, with the thermal break washer configured for use in mounting drainage fabric D, lathe L, and the like, along with securing with a retention washer. The system includes the use of such a washer with a retention washer mounted over the outwardly projecting protrusions, with the drainage fabric and lathe L there between, and with a fastener securing the retention washer to the body of the thermal break washer. Although shown in the illustrated embodiment as having two projections from both the upper and bottom sides of the washer, it should be appreciated that numerous alternatives may be employed. For example, less than or more than two protrusions may be provided on each or either side, including in alternative shapes, sizes and locations. Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A building material fastening system for securing building materials to a building, said system comprising:
   a thermal break washer having an outside and an underside disposed opposite said outside with a fastener aperture extending from said outside through to said underside and with said outside defining a solid upper surface, a mounting projection extending from said underside, and a support projection extending from said outside, with said mounting projection configured to be pressed into an inner building material to retain said thermal break washer on the inner building material; and
   a retention washer having a plurality of apertures;
   said fastener aperture configured to receive a first fastener for securing said thermal break washer to a building element with the inner building material disposed between the building element and thermal break washer, and with said support projection configured to receive and support an outer building material disposed on said support projection with said retention washer configured to be disposed over said support projection whereby the outer building material is disposed between said thermal break washer and said retention washer, and with said retention washer and said thermal break washer configured to receive a second fastener to secure said retention washer to said thermal break washer with the outer building material there between.

2. The fastening system of claim 1, wherein said mounting projection comprises a pair of mounting projections.

3. The fastening system of claim 1, wherein said support projection comprises a pair of support prongs.

4. The fastening system of claim 1, wherein said underside includes a sealing surface.

5. The fastening system of claim 1, wherein said thermal break washer further includes a pad portion configured to receive the second fastener used to retain the outer building material to said thermal break washer.

6. The fastening system of claim 1, wherein said retention washer includes at least two apertures, and wherein one of said apertures of said retention washer is configured to be disposed over said support projection with another of said apertures of said retention washer configured to receive the second fastener.

7. The fastening system of claim 1, wherein said thermal break washer has a central axis and said mounting projection comprises a pair of mounting projections and said support projection comprises a pair of support prongs, and wherein said support prongs are equally radially spaced from said central axis, and
   wherein said plurality of apertures of said retention washer comprises a plurality of alignment apertures, and
   wherein said support prongs of said thermal break washer are disposed through a pair of said alignment apertures when said retention washer is supported on said thermal break washer with the outer building material disposed between said thermal break washer and said retention washer.

8. The fastening system of claim 7, wherein said retention washer further includes a retention washer fastener aperture, and wherein said retention washer fastener aperture is configured to receive the second fastener.

9. The fastening system of claim 8, wherein said retention washer fastener aperture is centrally located on said retention washer with said alignment apertures radially disposed about said retention washer fastener aperture.

10. The fastening system of claim 9, wherein said thermal break washer comprises a plastic material and said retention washer is metallic.

11. A method of securing building materials to a building comprising:
   providing a thermal break washer, said thermal break washer having an outside and an underside disposed opposite said outside with a fastener aperture extending from said outside through to said underside and with said outside defining a solid upper surface, wherein a mounting projection extends from said underside and a support projection extends from said outside;
   providing a retention washer having a plurality of apertures;
   pressing the thermal break washer against a first building material such that the mounting projection extends into the first building material whereby said thermal break washer is self-supported on the first building material;
   driving a first fastener through the fastener aperture to secure the first building material to a building element;
   placing a second building material over the support projection of the thermal break washer with the support member extending through the second building material;

positioning an aperture of the retention washer over the support projection such that the second building material is positioned between the thermal break washer and the retention washer; and driving a second fastener through an aperture of the retention washer into the thermal break washer, with the second fastener being axially offset from the first fastener.

12. The method of claim 11, wherein said thermal break washer has a central axis and said mounting projection comprises a pair of mounting projections and said support projection comprises a pair of support prongs, and wherein said support prongs are equally radially spaced from said central axis, and wherein said plurality of apertures of said retention washer comprises a plurality of alignment apertures, and wherein said support prongs of said thermal break washer are disposed through a pair of said alignment apertures when said retention washer is supported on said thermal break washer with the outer building material disposed between said thermal break washer and said retention washer.

13. The method of claim 11, wherein said thermal break washer comprises a plastic material and said retention washer is metallic, and wherein the first building material comprises rigid foam insulation and the second building material comprises drainage fabric and lathe.

\* \* \* \* \*